INVENTOR
GORDON WELTON THOMPSON

ATTORNEY

United States Patent Office 3,460,194
Patented Aug. 12, 1969

3,460,194
APPARATUS FOR DIMENSIONAL STABILIZATION OF THERMOPLASTIC FILM
Gordon Welton Thompson, Clinton, Iowa, assignor to E. I. du Pont de Nemours and Company, Wilmington Del., a corporation of Delaware
Filed Sept. 8, 1965, Ser. No. 485,806
Int. Cl. B29c 25/00
U.S. Cl. 18—1           3 Claims

ABSTRACT OF THE DISCLOSURE

Apparatus for dimensionally stabilizing biaxially oriented, thermoplastic organic polymer film in continuous web form comprising, in succession, a driven film-feed roll, a plurality of closely spaced idler rolls positioned so that the film passing thereover contacts each roll for at least 90° of its circumference, a series of intermediate driven rolls, a driven takeup roll, a bowed film-spreading guide means immediately in advance of at least one intermediate driven roll, means for adjusting the speed of the driven rolls to permit retraction of the film, and means for heating the film.

---

Figure 1:
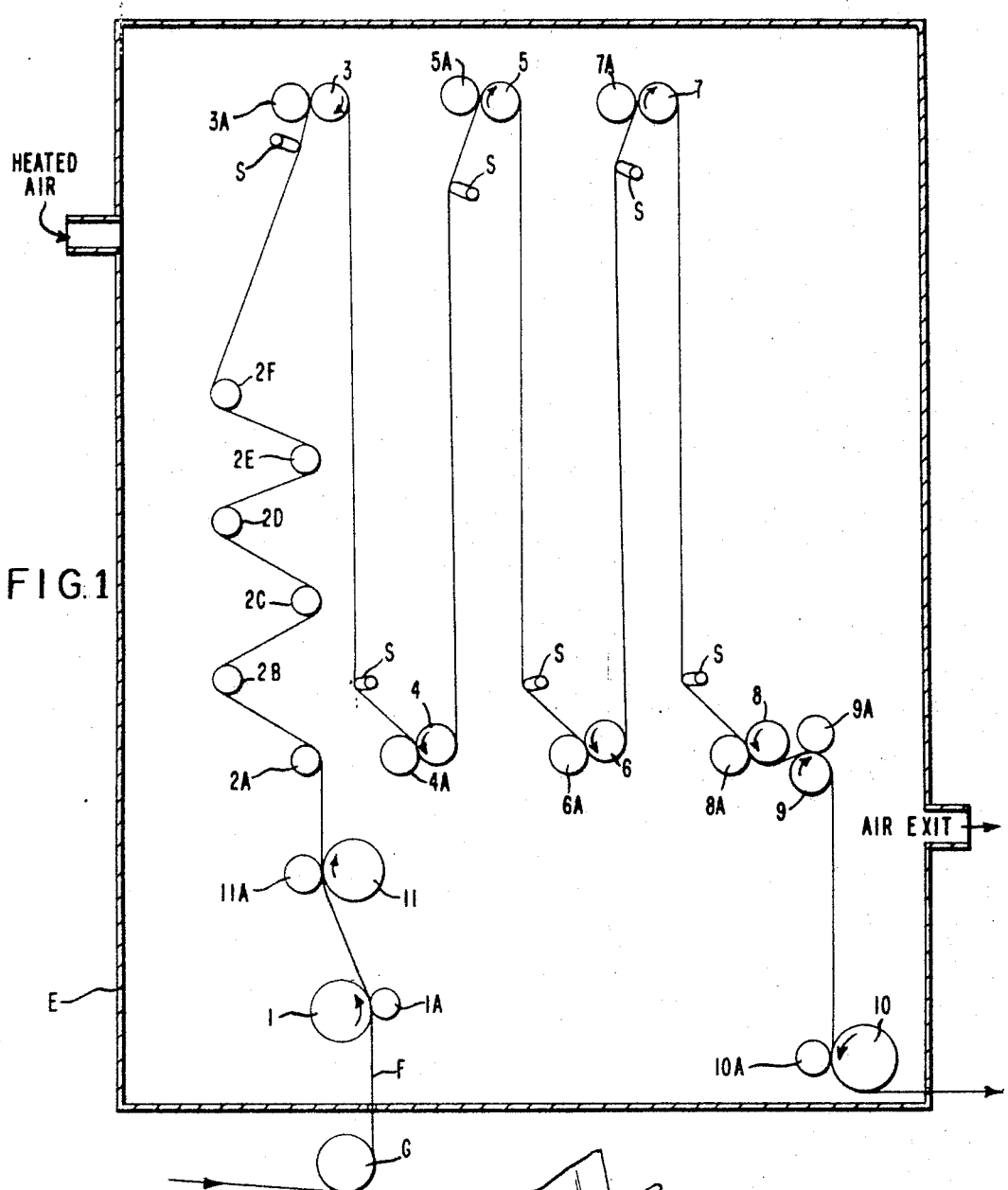

In the development of highly durable plastic films, in particular, polypropylene films for a variety of uses, it is known to improve the strength characteristics of the films by stretching them at least in one direction and preferably in both the machine direction (i.e., direction of extrusion) and the transverse direction. While such a procedure leads to enhancement of various physical properties of the film, such as a film has a tendency when exposed to somewhat elevated temperatures either during processing or under use conditions of retract toward the original dimensions of the film prior to stretching. For some purposes heat shrinkability is desirable but in many applications such behavior greatly interferes with the acceptability of films.

It is known to heat treat such an oriented film at an elevated temperature while either maintaining the dimensions of the film during the heat treating step or while permitting a certain predetermined amount of relaxation of the film in one or more directions while the heat treating is taking place. In the case of a film such as biaxially oriented polypropylene films, for example, it is necessary to permit a certain amount of relaxation in both the machine and transverse directions of the film in order to provide the desired combination of dimensional stability along with retention of desired physical properties. It is also desired to carry out the heat treating step on flat films inasmuch as heat treating film in flat form is in many respects more simple to carry out than is a heat treating step of film in tubular form. Heat treating of a biaxially oriented polypropylene film as a flat sheet, however, is not without problems. There is a tendency for such a film during heat treating to show greater transverse direction relaxation along the edges than in the center of the sheet which gives rise to distorted (wavy) edge lanes in the advancing film. In this condition it is difficult to maintain a proper tension on the film especially while undergoing concomitantly machine direction retraction to insure contact with the rolls so as to properly advance the film smoothly through the treating operation. Also there is a tendency as the film is advanced over driven rolls for wrinkles to occur in the film as the film contacts the supporting rolls.

Accordingly, it is an object of this invention to provide an apparatus for rendering an oriented thermoplastic film, e.g., polypropylene film, dimensionally stable without the attendant difficulties outlined above. It is a further object of this invention to provide for the strain relaxation of biaxially oriented polypropylene film, which will provide a controlled degree of machine direction retraction together with retraction in the transverse direction to a predetermined extent. These and related objects will more clearly appear from the following description.

The foregoing objects are realized by the present invention which, in its process embodiment, comprises in the process for the dimensional stabilization of a continuous web of biaxially oriented polypropylene film wherein the film maintained at a temperature within the range of from about 120° C. to about 150° C. and is allowed to retract between 5% to 40% in its transverse dimension (TD) and between 1% and 15% in its machine (longitudinal) direction (MD) as it is passed successively over a series of driven rolls, the improvements which comprise passing the web over and in contact with at least 90° of the circumference of each of a series of idler rolls located between the first and second driven rolls of said series of driven rolls, whereby the major portion of transverse retraction of the film takes place between the first and second driven rolls, and guiding the film into smooth contact with at least one of the driven rolls following the last of said idler rolls by passing the film over a guide member immediately adjacent the driven roll and presenting a film-spreading surface transverse to the direction of travel of the web and contacting the entire width of the web, and thereafter passing said film over the driven roll adjacent thereto.

Figure 2:
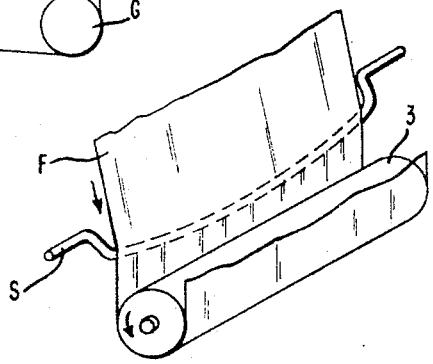

The invention will now be described with reference to the accompanying drawing wherein:

FIG. 1 is a diagrammatic representation of a preferred embodiment of the process and apparatus of this invention; and FIG. 2 illustrates diagrammatically one embodiment of a film-spreading device adjacent a driven roll for smoothing out wrinkles in the web just prior to passing the web over said driven roll.

Referring to FIG. 1, the essential elements of the apparatus are enclosed in a suitable conditioner chamber E through which is constantly circulated air or the like suitably heated by conventional means (not shown) to maintain the atmosphere at a temperature of from about 120° to about 150° C., and preferably within the range of 125° to 140° C. Biaxially oriented polypropylene film F in the form of a continuous web is guided into the chamber over idler guide roll G and through a suitable film-inlet slot. In the chamber the essential path of the film, as stated above, is over a first driven feed roll 1 and associated nip roll 1a, over driven roll 11, thence over a series of closely spaced idler rolls 2a, 2b, 2c, 2d, 2e and 2f disposed in staggered relationship such that the film contacts at least 90°, and preferably about 180° of the circumference of each roll. From the last idler roll the web of film is passed over each of a series of relatively widely spaced driven rolls comprising second driven roll 3, and rolls 4, 5, 6, 7, 8 and 9 and finally over driven take-off roll 10 and its associated nip roll 10a. The conditioned film is then taken from the chamber through a suitable film-exit slot. In the preferred embodiment of this invention the film is smoothed out (i.e., longitudinal wrinkles removed) before passing over at least one of the series of driven rolls in the path of the film following the idler rolls by passing the film over a moderately arched or curved (radius of curvature of 16 to 40 feet or more) spreader rod or roll S the arched surface of which extends transversely of the web and for the full width thereof, and thence over the immediately adjacent driven roll. In order to insure uniform and efficient heating of the film to the conditioning temperature all but the last of the series of driven rolls are controllably heated by suitable conventional means (not shown) and the final or take-off roll 10 is cooled to bring the temperature of the film to near normal temperature immediately as it exits from the conditioner. Further, to insure positive traction and uniform contact of the film with the driven intermediate rolls a cooperating nip roll 3a, 4a, etc., surfaced with an elastomeric material, is also preferably associated with each driven intermediate roll. And finally, in the preferred embodiment of the invention, an auxiliary driven roll 11 and cooperating nip roll 11a is positioned in the path of the film immediately after the feed roll 1 and ahead of the idler rolls 2a, 2b, etc. With incoming film which is especially "baggy" the speed of roll 11 with its associated nip roll 11a is set slightly higher than the speed of roll 1 to provide a slight pull-up at this point; otherwise rolls 1 and 11 are driven at the same speed. When roll 11 is used, relaxation of the film will of course first occur between this roll and roll 3, above referred to as the "second" driven roll, in which event roll 11 will become the "first" driven roll for purposes of defining the position of the idler rolls.

The tension on the film and hence the extent of retraction of the film as it passes through the conditioner is controlled by control of the relative speeds of the feed and take-off rolls 1 (or 11) and 10 respectively, by conventional speed control means (not shown). A recommended practice is first to set the speed of the take-off roll 10 which will determine the speed at which the film leaves the conditioner. The speed of the film entering the conditioner is set by the speed of the feed roll 1. The speed of roll 3 is set at about the same speed as roll 1 or slightly lower and the intermediate driven rolls, that is, the rolls following roll 3 and preceding the last roll, will, in general, be operated at the same speed as the take-off roll so that substantially most of the transverse retraction of the film takes place between the first (roll 1 or roll 11) and second (roll 3) driven roll and the longitudinal retraction takes place mainly between roll 3 and the next subsequent roll or rolls traveling at the speed of the take-off roll 10. It is to be understood, however, that it may be desirable in some instances, depending upon the quality of the film entering the conditioner with respect to degree of flatness and presence of wrinkles, bagginess, etc., to operate with a different roll speed and roll temperature pattern; but in any case, because of the interposed idler rolls, the major portion of the transverse direction retraction, i.e., at least 60%, will take place between the first and second driven rolls. A typical operating pattern effective in conditioning biaxially oriented polypropylene film, is to set the feed roll at a speed 6% faster than that of the take-off roll, and to set the intermediate driven rolls at progressively slower speeds whereby substantially all the transverse retraction (relaxation) takes place between the first and second driven rolls and the longitudinal retraction takes place after the film has passed the second driven roll (roll 3). In some instances, it may be desirable to have some idler rolls positioned in the spans beyond roll 3.

The essential features of this invention reside in the provision of a series (at least 2 and preferably as many as space and optimum dwell time of an increment of film in the conditioner will permit) idler rolls between the first and second driven rolls thus insuring a major proportion of transverse relaxation between these two points, and the use of a spreading device, either a curved rod or a driven roll having a curve in the axial direction or a two section pivoted idler roll, prior to transfer over at least one, and preferably all, intermediate driven rolls to insure that the film does not develop wrinkles or folds during treatment.

The idler rolls should be closely spaced, e.g., 4 inch diameter rolls with their centers spaced between about 6 to about 18 inches, and so positioned relatively that the film contacts at least 90° and preferably about 180° of the circumference of each roll.

A preferred sperading device is a two section roll, pivoted to allow transverse adjustment at the center, positioned with its axis transverse to the direction of travel of the film, and having sufficient offset at the center to provide substantial transverse spreading of the film. Alternatively, a rod having a radius of curvature of about 16 feet provides very satisfactory smoothing, although rods with less curvature (30 to 40 feet radius of curvature or more) may be used effectively.

The following example is further illustrative of this invention.

Example 1

A tube of polypropylene film which had been extruded and biaxially oriented following the procedure described in U.S. Patent 3,141,912 by expanding the extruded tube approximately 5 times its initial circumference (TD direction of the film) and by drawing 5 times its initial length (MD direction of the film) was slit into sheets. One of these sheets was then fed through the equipment illustrated in FIG. 1 at such a rate that the residence time within the conditioner was approximately 2 seconds and temperature within the conditioner was approximately 130° C. The film after being processed through this apparatus showed a degree of shrinkage of 2.3% in the MD direction and 0.5% in the transverse direction when heated at 130° C. for one minute. The heat treated film was free of wrinkles and folds. By contrast, in a control experiment carried without threading the film through the series of spreader rolls and under the same treating conditions, produced film that was badly wrinkled and folds were ironed into the film surface to the extent that the film was not usable. For further comparison purposes, the film before being heat treated showed a degree of shrinkage when heated at 130° C. for one minute of 8% in the machine direction and 20% in the transverse direction. When the apparatus was operated without the spreading devices, the film invariably developed folds as it came into contact with the several driven rolls.

What is claimed is:

1. In apparatus for the dimensional stabilization of continuous webs of biaxially oriented, thermoplastic, organic polymer film comprising a driven feed roll, a series of intermediate, spaced-apart, driven rolls, and a take-off roll over which a continuous web of film passes in turn, means for adjusting the relative linear speeds of the feed and take-off rolls whereby to permit retraction of film passing therebetween, and means for heating the film to and maintaining the film at an elevated temperature as it passes between the feed and take-off rolls; the improvements which comprise, a plurality of closed spaced idler rolls positioned in the path of the film between the feed roll and the first of the series of intermediate driven rolls, said rolls being further positioned that film passing thereover contacts each roll for at least 90° of the circumference of the roll, and spreading means positioned in the path of the film and immediately adjacent to and in advance of at least one of the intermediate driven rolls, operative to bow the film transversely before it passes over the roll adjacent thereto.

2. The apparatus of claim 1 wherein the spreading means is a curved rod.

3. The apparatus of claim 1 wherein the spreading means is a curved driven roll.

References Cited

UNITED STATES PATENTS

| | | | |
|---|---|---|---|
| 2,311,755 | 2/1943 | Hutchinson et al. | 18—15 |
| 2,321,635 | 6/1943 | Taylor. | |
| 2,603,838 | 7/1952 | Lowry et al. | |
| 2,916,767 | 12/1959 | Stevens | 18—15 |
| 3,004,284 | 10/1961 | Limbach | 18—1 |
| 3,201,826 | 8/1965 | Bruckner | 18—1 |

WILLIAM J. STEPHENSON, Primary Examiner